(12) United States Patent
Arora et al.

(10) Patent No.: US 7,644,184 B2
(45) Date of Patent: Jan. 5, 2010

(54) UNIVERSAL ADAPTER

(75) Inventors: Ashutosh Arora, Burlingame, CA (US); Pradeep Chand Bollineni, Sunnyvale, CA (US); Sam Prasad Kaipa, San Francisco, CA (US); Gregory Leonidovich Klets, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 11/008,475

(22) Filed: Dec. 8, 2004

(65) Prior Publication Data

US 2006/0136601 A1 Jun. 22, 2006

(51) Int. Cl.
*G06F 15/13* (2006.01)

(52) U.S. Cl. ............... 709/246; 709/212; 709/217; 707/205; 715/853; 715/854

(58) Field of Classification Search ............... 709/212, 709/217, 246; 707/205; 715/853, 854
See application file for complete search history.

(56) References Cited

U.S. PATENT DOCUMENTS

| | | | |
|---|---|---|---|
| 5,202,977 A | 4/1993 | Pasetes et al. | |
| 6,173,327 B1 | 1/2001 | De Borst et al. | |
| 6,208,345 B1 * | 3/2001 | Sheard et al. | 715/853 |
| 6,219,790 B1 | 4/2001 | Lloyd et al. | |
| 6,222,533 B1 | 4/2001 | Notani et al. | |
| 6,256,676 B1 * | 7/2001 | Taylor et al. | 709/246 |
| 6,453,356 B1 | 9/2002 | Sheard et al. | |
| 6,687,873 B1 | 2/2004 | Ballantyne et al. | |
| 6,718,332 B1 | 4/2004 | Sitaraman et al. | |
| 6,753,889 B1 | 6/2004 | Najmi | |
| 7,281,060 B2 * | 10/2007 | Hofmann et al. | 709/246 |
| 7,296,042 B2 * | 11/2007 | Edwards et al. | 707/205 |
| 2002/0116454 A1 | 8/2002 | Dyla et al. | |
| 2002/0152339 A1 | 10/2002 | Yamamoto | |
| 2003/0074217 A1 | 4/2003 | Beisiegel et al. | |
| 2003/0093402 A1 | 5/2003 | Upton | |
| 2003/0101284 A1 | 5/2003 | Cabrera et al. | |
| 2003/0110297 A1 | 6/2003 | Tabatabai et al. | |
| 2004/0006608 A1 | 1/2004 | Swarna et al. | |
| 2004/0064503 A1 | 4/2004 | Karakashian et al. | |
| 2004/0177360 A1 * | 9/2004 | Beisiegel et al. | 719/316 |
| 2005/0015439 A1 * | 1/2005 | Balaji et al. | 709/203 |
| 2005/0114549 A1 * | 5/2005 | Durham et al. | 709/246 |

* cited by examiner

*Primary Examiner*—Jinsong Hu
(74) *Attorney, Agent, or Firm*—Janaki K. Davda; Konrad Raynes & Victor LLP

(57) ABSTRACT

Techniques are provided for application integration. Data is received at a universal adapter, wherein the universal adapter executes as a single process. One or more data transformers to be used to convert the data are identified. The data is converted using the identified one or more data transformers. Then, the data is routed to one of an application or integration engine.

32 Claims, 20 Drawing Sheets

| | Standard Proper... | Connector-Spe... | Supported Busi... | Associated Maps | Resources | Trace/Log Files |
|---|---|---|---|---|---|---|
| | Property | Value | Encrypt | Update Method | | Description |
| 1 | Connector Type | WebService | ☐ | agent restart | | |
| 2 | ⊞ ProtocolHandlerFramework | | ☐ | agent restart | | |
| 3 | DataHandlerMetaObjectName | MO_DataHandler_Default | ☐ | agent restart | | |
| 4 | ⊞ JNDI | | ☐ | agent restart | | |
| 5 | ⊟ ProtocolListenerFramework | | ☐ | agent restart | | |
| 6 | WorkerThreadCount | 10 | ☐ | agent restart | | |
| 7 | RequestPoolSize | 20 | ☐ | agent restart | | |
| 8 | ⊟ ProtocolListeners | | ☐ | agent restart | | |
| 9 | ⊞ SOAPHTTPListener1 | | ☐ | agent restart | | |
| 10 | ⊞ SOAPHTTPSListener1 | | ☐ | agent restart | | |
| 11 | ⊟ SOAPJMSListener1 | | ☐ | agent restart | | |
| 12 | Protocol | xml/soap | ☐ | agent restart | | |
| 13 | SOAPDHMimeType | | ☐ | agent restart | | |
| 14 | InputQueue | ORDER_INPUT | ☐ | agent restart | | |
| 15 | InProgressQueue | ORDER_INPROGRESS | ☐ | agent restart | | |
| 16 | ArchiveQueue | ORDER_ARCHIVE | ☐ | agent restart | | |
| 17 | UnsubscribedQueue | ORDER_UNSUBSCRIBED | ☐ | agent restart | | |
| 18 | ErrorQueue | ORDER_ERROR | ☐ | agent restart | | |
| 19 | InDoubtEvents | Reprocess | ☐ | agent restart | | |
| 20 | ReplyToQueue | ORDER_REPLYTO | ☐ | agent restart | | |
| 21 | JMSVendorURI | | ☐ | agent restart | | |
| 22 | RequestWaitTimeout | 60000 | ☐ | agent restart | | |
| 23 | BOPrefix | | ☐ | agent restart | | |
| 24 | SessionPoolSize | 2 | ☐ | agent restart | | |
| 25 | ⊞ ProxyServer | | ☐ | agent restart | | |
| 26 | ⊞ SSL | | ☐ | agent restart | | |

FIG. 4

|   | Standard Properties | Application Config Properties | Value | Supported Business Objects | |
|---|---|---|---|---|---|
|   | Property | | | Update | Trace / Encrypt |
| 1 | DataHandlerMetaObjectName | | MO_DataHandler_Default | agent restart | ☐ |
| 2 | ConnectorType | | WebService | agent restart | ☐ |
| 3 | ⊞ ProxyServer | | | agent restart | ☐ |
| 4 | ⊞ SSL | | | agent restart | ☐ |
| 5 | ⊞ ProtocolListenerFramework | | | agent restart | ☐ |
| 6 | ⊞ ProtocolHandlerFramework | | | agent restart | ☐ |
| 7 | ⊟ ProtocolHandlers | | | agent restart | ☐ |
| 8 | ⊟ SOAPHTTPHTTPSHandler —502 | | | agent restart | ☐ |
| 9 | Protocol | | soap/http —510 | agent restart | ☐ |
| 10 | HTTPReadTimeout | | 0 | agent restart | ☐ |
| 11 | ⊞ SOAPJMSHandler —504 | | | agent restart | ☐ |
| 12 | ⊞ JNDI | | | agent restart | ☐ |
| 13 | ⊞ WSCollaborations | | | agent restart | ☐ |

| | | General | Attributes | | | | | | | | |
|---|---|---|---|---|---|---|---|---|---|---|---|
| | Pos | Name | Type | Key | Foreign Key | Required | Cardinality | Maximum | Default Value | Application Specific Information | Comments |
| 1 | 1 | ⊞ text_xml — 602 | gemeo_MO_DataHandler_XMLConfig | ☑ | ☐ | ☐ | 1 | | | | |
| 1.1 | 1.1 | BOPrefix | String | ☐ | ☐ | ☐ | | 255 | | | |
| 1.2 | 1.2 | EntityResolver | String | ☐ | ☐ | ☐ | | 255 | | | |
| 1.3 | 1.3 | DTDPath | String | ☐ | ☐ | ☐ | | 255 | | | |
| 1.4 | 1.4 | NameHandlerClass | String | ☐ | ☐ | ☐ | | 255 | com.crossworlds.DataHandlers.-xml.TopElementNameHandler | | |
| 1.5 | 1.5 | Parser | String | ☐ | ☐ | ☐ | | 255 | | | |
| 1.6 | 1.6 | Validation | String | ☐ | ☐ | ☐ | | 255 | false | | |
| 1.7 | 1.7 | ClassName | String | ☐ | ☐ | ☐ | | 255 | com.crossworlds.Datahandlers.text.xml | | |
| 1.8 | 1.8 | UseNewLine | String | ☐ | ☐ | ☐ | | 255 | false | | |
| 1.9 | 1.9 | InitialBufferSize | String | ☐ | ☐ | ☐ | | 255 | 2097152 | | |
| 1.10 | 1.10 | DefaultEscapeBehavior | String | ☐ | ☐ | ☐ | | 255 | true | | |
| 1.11 | 1.11 | IgnoreUndefinedElements | String | ☐ | ☐ | ☐ | | 255 | false | | |
| 1.12 | 1.12 | IgnoreUndefinedAttributes | String | ☐ | ☐ | ☐ | | 255 | true | | |
| 1.13 | 1.13 | DummyKey | String | ☑ | ☐ | ☐ | | 255 | 1 | | |
| 1.14 | 1.14 | ObjectEventId | String | ☐ | ☐ | ☐ | | | | | |
| 2 | 2 | ⊞ xml_soap — 604 | gemeo_MO_DataHandler_SOAPConfig | ☐ | ☐ | ☐ | 1 | | | | |
| 2.1 | 2.1 | ClassName | String | ☐ | ☐ | ☐ | | 255 | com.ibm.adapters.datahandlers.xml.soap | | |
| 2.2 | 2.2 | SOAPName Handler | String | ☐ | ☐ | ☐ | | 255 | | | |
| 2.3 | 2.3 | ObjectEventId | String | ☐ | ☐ | ☐ | | | | | |
| 3 | 3 | ObjectEventId | String | ☐ | ☐ | ☐ | | | | | |
| 4 | 4 | | | | | ☐ | | 255 | | | |

FIG. 6

| # | Property | Value | Encrypt | Update Method | Description |
|---|---|---|---|---|---|
| 1 | ⊞ ProtocolHandlerFramework | | ☐ | agent restart | |
| 2 | DataHandlerMetaObjectName | MO_DataHandler_Default | ☐ | agent restart | |
| 3 | ⊟ ProtocolListenerFramework | | ☐ | agent restart | |
| 4 | WorkerThreadCount | 10 | ☐ | agent restart | |
| 5 | RequestPoolSize | 20 | ☐ | agent restart | |
| 6 | ⊟ ProtocolListeners | | ☐ | agent restart | |
| 7 | ⊟ SOAPHTTPListener | | ☐ | agent restart | |
| 8 | Host | localhost | ☐ | agent restart | |
| 9 | Port | 8084 | ☐ | agent restart | |
| 10 | Protocol | soap/http | ☐ | agent restart | |
| 11 | SocketQueueLength | 5 | ☐ | agent restart | |
| 12 | HTTPReadTimeout | 0 | ☐ | agent restart | |
| 13 | RequestWaitTimeout | 60000 | ☐ | agent restart | |
| 14 | BOPrefix | | ☐ | agent restart | |
| 15 | ⊟ URLsConfiguration | | ☐ | agent restart | |
| 16 | ⊟ URL1 | | ☐ | agent restart | |
| 17 | ContextPath | /url1 | ☐ | agent restart | |
| 18 | Enabled | true | ☐ | agent restart | |
| 19 | ⊟ TransformationRules | | ☐ | agent restart | |
| 20 | ⊟ TransformationRuleAnyContentType | | ☐ | agent restart | |
| 21 | ContentType | */* | ☐ | agent restart | |
| 22 | MimeType | xml/soap | ☐ | agent restart | |
| 23 | Charset | UTF8 | ☐ | agent restart | |
| 24 | ⊟ TransformationRulePlainXml | | ☐ | agent restart | |
| 25 | ContentType | text/* | ☐ | agent restart | |
| 26 | MimeType | text/xml | ☐ | agent restart | |
| 27 | Charset | UTF8 | ☐ | agent restart | |
| 28 | ⊞ SOAPHTTPSListener1 | | ☐ | agent restart | |
| 29 | ⊞ SOAPJMSListener1 | | ☐ | agent restart | |
| 30 | ⊞ ProxyServer | | ☐ | agent restart | |
| 31 | ⊞ SSL | | ☐ | agent restart | |
| 32 | UseDefaults | true | ☐ | agent restart | |
| 33 | ConnectorType | WebService | ☐ | agent restart | |

FIG. 7

```
/**
 *Interface for Protocol listener.
 */
public interface ProtocolListener
{
        /**
         *Initializes the protocol listener.
         *
         *@param Reference to the PLF
         *@param Listener name
         *@param Listener properties
         *
         *@return none
         *
         *@throws InitializationException if there is a fatal error during
         *initialization.
         */
        public void initialize(
                String listenerName,
                Object listenerProperties) throws InitializationException;

/**
         *Terminates the protocol listener.
         *
         *@param none
         *
         *@return none
         *@throws TerminationException if there is fatal error during
         *termination
         */
        public void terminate() throws TerminationException;

/**
         *The protocol listener starts listening.
         *
         *@param none
         *
         *@return none
         *@throws StartListeningException if there is fatal error.
         */
        public void startListening() throws StartListeningException;
```

FIG. 10A

```
/**
 *Get the listener name
 */
public String getListenerName();

/**
 *method to return protocol type
 */
public String getProtocol();

/**
 *Adds Service Request to the request pool.
 *
 *@param Service Request
 *
 *@return none
 *
 *@throws AddToQueueException if adding to the queue
 *has failed, ShutdownDetectedException exception
 *if shutdown flag was detected before adding the item
 *to the request pool.
 */
public void addToQueue(ServiceRequest serviceRequest) throws
AddToQueueException, ShutdownDetectedException;
}
```

FIG. 10B

```
/**
 *Interface for Protocol Listener Service Request.
 */
public interface ServiceRequest
{
        /**
         *Executes this service request by sending the converted to Business Object
         *request to the broker(async or sync).
         *
         *@param none
         *
         *@return none
         *@throws ExecuteRequestException if execution of request failed.
         */
        public void executeRequest() throws ExecuteRequestException;
}
```

```
/**
 *Interface for protocol handler.
 */
public interface ProtocolHandler
{
        /**
         *Initializes the protocol handler.
         *
         *
         *@param Reference to the PHF
         *@param Handler name
         *@param Handler properties
         *
         *@return none
         *@throws InitializationException
         */
        public void initialize(
                ProtocolHandlerFramework phf,
                String handlerName,
                Object handlerProperties) throws InitializationException;

/**
         *Terminates the protocol handler
         *
         *@param none
         *
         *@return none
         *@throws TerminationException
         */
        public void terminate() throws TerminationException;
```

```
/**
*Process the business object by sending it to the given service.
*
*@param request bo. (in/out parameter)
*
*@return int response status
*
*@throws ProcessRequestFatalException if event cannot be processed and a fatal
*condition has been found.
*
*@throws ProcessRequestException if event cannot be processed. (non
*fatal for the whole connector)
*/
public int processRequest(Object requestBO) throws
ProcessRequestException, ProcessRequestFatalException;

/**
*Gets the name of the protocol handler.
*
*@return Protocol handler name; null if name is not set
*/
public String getHandlerName();

```
/**
*Factory to create an instance of the data transformer class
*/
public class DataTransformerFactory
{
  /**
    *Create the data transformer based on the class name. Initialize the
    *data transformer with the configuration object.
    *@param className name of the class implementing the DataTransformer interface
    *@param config Configuration object used to store configuration information
    *       to be used by the data transformer during transformation.
    *@return data transformer instance
    */
  public DataTransformer createTransformer(String className, Config config)

}

/**
  *Data transformers implement the DataTransformer interface
  */
public interface DataTransformer
{

/**
    *Transform data in external application format to a generic internal format.
    *@param externalData external application data passed as an InputStream
    *@param config configuration object to be used during transformation for
    *       passing additional transformation parameters
    *@return transformed business object in generic internal data format
    *@exception DataTransformationException business data level errors during
    *           data transformation
    *@exception ReadException errors reading the input stream
    */
  public BusinessObjectInterface getBO(InputStream externalData, Config config)
      throws DataTransformationException, ReadException;
```

FIG. 13A

```
/**
 *Transform data in generic internal data format to an external application
 *format.
 *@param bo business object in generic internal data format
 *@param config configuration object to be used during transformation for
 *       passing additional transformation parameters
 *@return external application data in an InputStream
 *@exception DataTransformationException business data level errors during
 *           data transformation
 *@exception ReadException errors reading the generic internal business object
 */
public InputStream getStreamFromBO(BusinessObjectInterface bo, Config config)
    throws DataTransformationException, ReadException;

}
/**
 *Configuration used to store data transformation options
 */
public interface Config
{

/**
   *Set data transformation option
   *@param optionName name of the option
   *@param option data transformation option to be set
   */
  public void setOption(String optionName, Object option);

/**
   *Get data transformation option
   *@param optionName name of the option to be retrieved
   *@return option object corresponding to the optionName, null if option
   *        does not exist
   */
  public Object getOption(String optionName);

UNIVERSAL ADAPTER

BACKGROUND

1. Field

Implementations of the invention relate to a universal adapter.

2. Description of the Related Art

Conventional business integration solutions have started with point-to-point models, and have evolved to more robust systems based on a hub-and-spoke model. In the point-to-point model, each application is connected to every other application directly. Thus, in order to integrate N applications, the point-to-point model requires to the order of N*N independent connections. In a hub-and-spoke model, applications talk to each other through a centralized integration server ("hub"). The spokes may be described as connections between applications and adapters. Thus, the hub-and-spoke model requires to the order of N independent connections for integrating N applications. An "adapter" provides connectivity between the hub and an application.

Conventional adapters do not support multiple transport protocols ("protocols") and data formats in the same runtime (i.e., when an application is being executed). Transport protocols are protocols used to transport data, such as HyperText Transport Protocol (HTTP). Data formats describe the format of data, such as HyperText Markup Language (HTML). For example, in the hub-and-spoke model, a different adapter is required for each application. Each adapter provides connectivity between the hub and an application using a particular data format and/or technology specific to the application. Each adapter converts the particular data format and/or technology specific from a first application to a generic data format, which is then converted at a different adapter to the particular data format and/or technology specific to a second application. In this manner, the first and second applications communicate with each other.

Moreover, many businesses, such as small and medium size enterprise businesses, do not have the resources to deploy and maintain numerous independent adapters.

Thus, there is a continued need in the art for improved adapters.

SUMMARY OF THE INVENTION

Provided are a method, article of manufacture, and system for application integration. Data is received at a universal adapter, wherein the universal adapter executes as a single process. One or more data transformers to be used to convert the data are identified. The data is converted using the identified one or more data transformers. Then, the data is routed to one of an application or integration engine.

BRIEF DESCRIPTION OF THE DRAWINGS

Referring now to the drawings in which like reference numbers represent corresponding parts throughout:

FIG. 4 illustrates properties for protocol listeners in accordance with certain implementations.

FIG. 5 illustrates properties for protocol handlers in accordance with certain implementations.

FIG. 6 illustrates properties for data transformers in accordance with certain implementations.

FIG. 7 illustrates data transformer rules for a protocol listener 700 in accordance with certain implementations.

FIGS. 10A and 10B illustrate sample interfaces for implementing a custom protocol listener in accordance with certain implementations.

FIG. 10C illustrates a sample interface for implementing a protocol listener service request interface in accordance with certain implementations.

FIGS. 11A and 11B illustrate sample interfaces for implementing a custom protocol handler in accordance with certain implementations.

FIGS. 13A and 13B illustrate sample interfaces for implementing a data transformer in accordance with certain implementations.

DETAILED DESCRIPTION OF THE IMPLEMENTATIONS

In the following description, reference is made to the accompanying drawings which form a part hereof and which illustrate several implementations. It is understood that other implementations may be utilized and structural and operational changes may be made without departing from the scope of the invention.

Implementations provide a universal adapter with a flexible, configurable architecture supporting multiple transport protocols and data formats for application integration.

Figure 1:
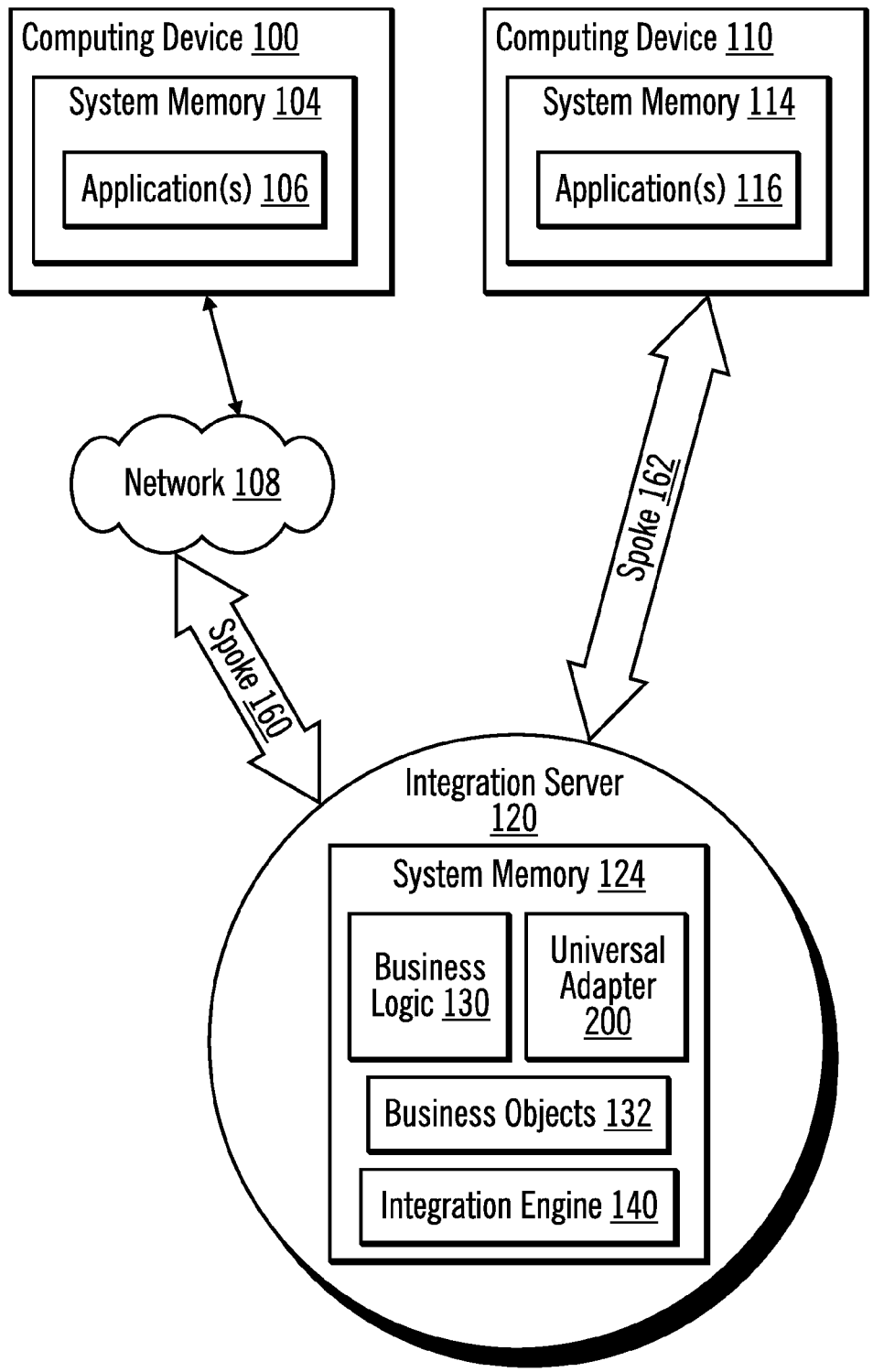
FIG. 1 illustrates details of a computer architecture in which certain implementations may be implemented.

FIG. 1 illustrates details of a computer architecture in which certain implementations may be implemented. The computer architecture is a hub and spoke model. Integration server 120 serves as a "hub", and spokes 160, 162 connect the integration server 120 to computing devices 100 and 110, respectively. Although only two computing devices 100, 110 are illustrated, any number of computing devices may be coupled to integration server 120. Each computing device 100, 110 includes system memory 104, 114, respectively, and one or more applications 106, 116, respectively. The applications 106, 116 may communicate with each other via the integration server 120.

Computing device 100 is coupled to integration server 120 via a network 108. The network 108 may comprise any type of network, such as, for example, a Storage Area Network (SAN), a Local Area Network (LAN), Wide Area Network (WAN), the Internet, an Intranet, etc.

Applications 106 transmit data to the integration server 120 via the network 108 with various data formats, such as HyperText Markup Language (HTML), Extensible Markup Language (XML), Electronic Data Interchange (EDI), binary messages, name-value pairs, etc. Applications 116 transmit data directly (i.e., rather than through a network) to integration server 120, and the data may be in any data format.

The integration server 120 includes system memory 124. The system memory includes business logic 130 and business objects 132. Business logic. 130 may be described as procedures in a business software system that implements an organization's day-to-day operations (such as processing an order, payroll management, and so on). Business logic 130 includes industry-standard procedures for business operations and customizations reflecting an organization's unique business policies. A business object 132 may be described as a set of attributes that represent a business entity (e.g., Employee), an action on the data (e.g., create or update operations), and instructions for processing the data. Business objects 132 are used to exchange information and trigger actions.

The system memory 124 includes an integration engine 140. The integration engine 140 integrates data among heterogeneous applications. The integration engine 140 provides a variety of services that include the ability to route data, a repository of rules that govern the integration process, connectivity to a variety of applications, and administrative capabilities that facilitate integration. The system memory 126 also includes a single universal adapter 200 that may be used by the integration engine 140 to route data. The universal adapter 200 provides services, such as event detection, messaging (e.g., asynchronous or synchronous), transaction management, logging, security, archiving, data transformation etc.

The integration server 120 may be described as a broker between applications 106, 116. That is, applications 106, 116 at different computing devices 100, 110 may communicate with each other through the integration server 120 using the integration engine 140 and universal adapter 200.

The integration server 120 may implement a publish-subscribe or a request-reply architecture. A publish-subscribe architecture may be described as a style of messaging between applications in which the providers of information (publishers) are decoupled from the consumers of that information (subscribers) using a broker. In a request-reply architecture, a business object may make a request or process a reply. The integration server 120 provides compensating transactions, thread management, Java® runtime, error handling, and event scheduling.

Figure 2:
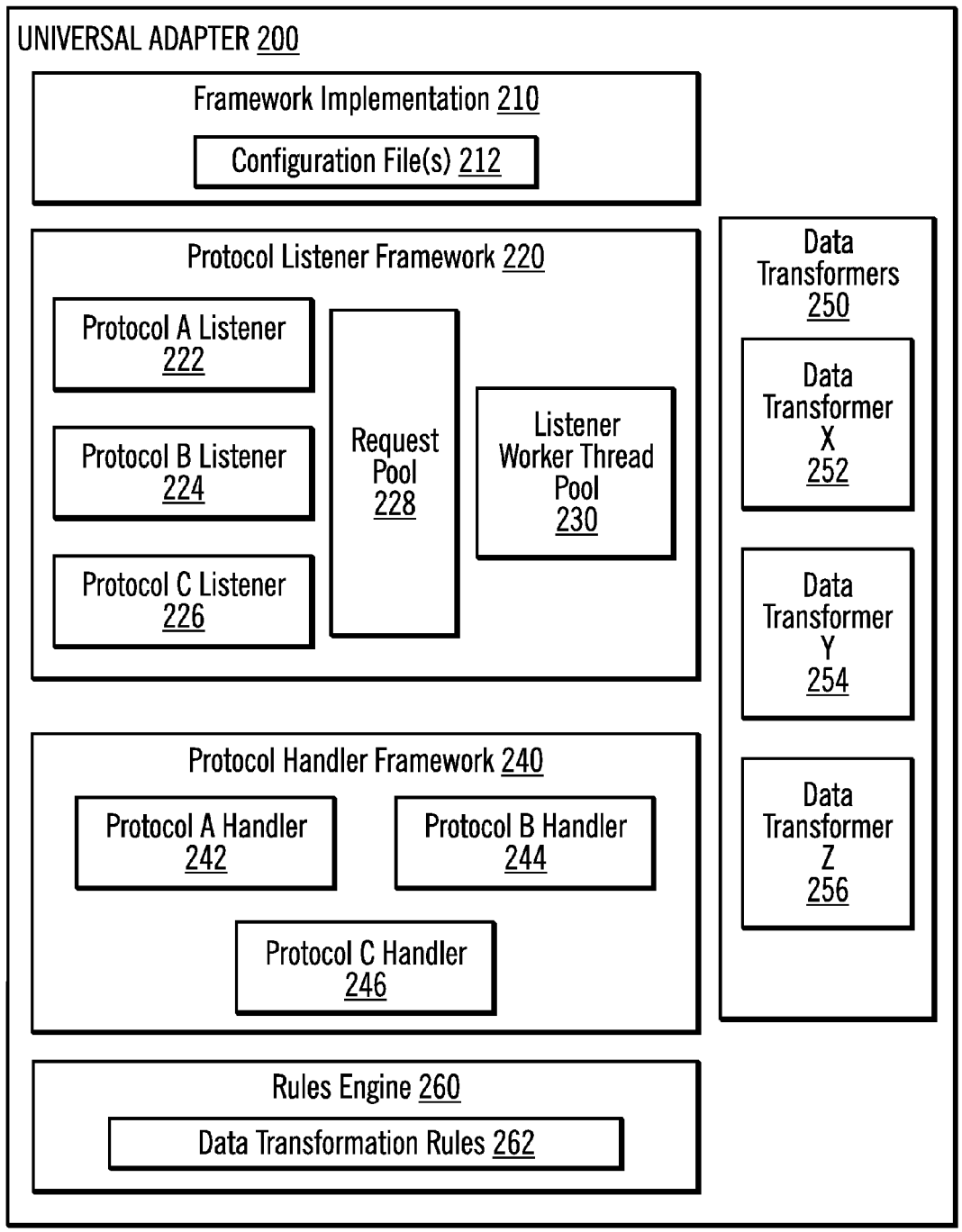
FIG. 2 illustrates a universal adapter in accordance with certain implementations.

FIG. 2 illustrates a universal adapter 200 in accordance with certain implementations. Although the universal adapter 200 is illustrated at integration server 120, the universal adapter 200 may instead be a separate component that is coupled to server computer 200. Although the universal adapter 200 is illustrated as a separate component from the integration engine 140, the universal adapter 200 may be plugged into the integration engine 140. The universal adapter may run in a single process (e.g., a single process instantiated on a Java® virtual machine). A process is a single execution module that runs concurrently with other executable modules. The universal adapter 200 includes a framework implementation 210, a protocol listener framework 220, a protocol handler framework 240, and data transformers 250.

The framework implementation 210 provides generic enterprise level services, such as reading configuration data, persistence, and reliability to both the protocol listener and protocol handler frameworks. In particular, the framework implementation 210 stores one or more configuration files 212 containing configuration data persistently. The framework implementation 210 also acts as an interface between the universal adapter 200 and the integration engine 140.

The protocol listener framework 220 supports the development of protocol listeners 222, 224, 226 used to relay data (e.g., in the form of requests) between applications 106, 116. In particular, the protocol listener framework 220 includes protocol listeners 222, 224, 226, a request pool 228, and a listener worker thread pool 230. Each protocol listener 222, 224, 226 processes data that is received in a particular protocol. For example, the protocol A listener 222 may process data received via HyperText Transport Protocol (HTTP), the protocol B listener 224 may process data received via Simple Mail Transfer Protocol (SMTP), and the protocol C listener 226 may process data received via a Java® Message Service (JMS). Then, when data is received from an application 106, 116 at the universal adapter 200 in a particular protocol, the appropriate protocol listener 222, 224, 226 processes the data, as will be described further with reference to FIGS. 8A, 8B, and 8C. The request pool 228 stores requests coming into the universal adapter 200. The listener worker thread pool 230 maintains a pool of threads and hands over a request to a thread that is not busy. A thread may be described as a stream of computer instructions that is in control of a process or may be described as a basic unit of program execution.

The protocol handler framework 240 supports the development of protocol handlers 242, 244, 246 used to make requests to applications 106, 116. The protocol handler framework 240 includes protocol handlers 242, 244, and 246. Each protocol handler 242, 244, 246 processes data to be sent in a particular protocol for an application, and the processing of data will be described further with reference to FIGS. 8A, 8B, and 8C. For example, the protocol A handler 242 may process data to be sent via HTTP, the protocol B handler 244 may process data to be sent via SMTP, and the protocol C handler 246 may process data to be sent via JMS.

The data transformers 250 are used to perform data transformation between internal data formats and application data formats. Internal data formats may be described as an internal representation of data used by the integration server, while the application data formats may be described as the data formats that applications 106, 116 expose to external applications 106, 116. A first application (e.g., 106) may be described as being "external" to each other application (e.g., 116) with which the first application (e.g., 106) communicates. Each data transformer 252, 254, 256 is able to transform data from one particular data format to another. For example, the data transformer X 252 transforms data between Simple Object Access Protocol (SOAP) and the internal data format, the data transformer Y 254 transforms data between Data Interchange American National Standards X12 (EDI ANSI X12) and the internal data format, and the data transformer Z 256 transforms data between Society for the Worldwide Interbank Financial Telecommunication (SWIFT) data format and the internal data format.

SOAP provides a definition that is XML based and used for exchanging structured and typed information between peers in a decentralized, distributed environment. In particular, SOAP specifies how to encode an HTTP header and an XML file so that an application 106, 116 at one computing device 100, 110 can communicate with an application program 106, 116 at another computing device 100, 110. EDI ANSI X12 is a data format for exchanging business data developed by the Data Interchange Standards Association. SWIFT is a data format for exchanging financial data developed by the Society for the Worldwide Interbank Financial Telecommunication.

The protocol listeners 222, 224, 226 and protocol handlers 242, 244, 246 may invoke the data transformers 252, 254, 256 to convert data to a particular data format. In certain implementations, the data to be converted specifies the data transformer 252, 254, 256 or specifies the type of conversion.

In certain implementations, the universal adapter 200 includes some protocol listeners, protocol handlers, and data transformers, but a user is able to also create custom protocol listeners, protocol handlers, and data transformers and utilize their services through the universal adapter 200. Also, the number of protocol handlers may be different from the number of protocol listeners.

A rules engine 260 enables data transformation rules 262 to be specified. The data transformation rules 262 may be used to determine which data transformer 252, 254, 256 is to be used for data transformation.

Figure 3:
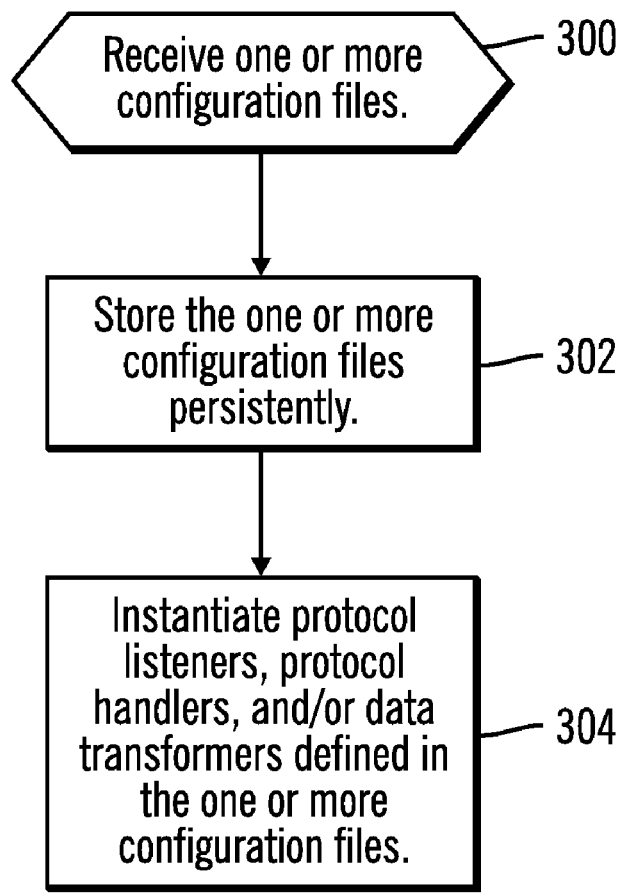
FIG. 3 illustrates logic for processing configuration data in accordance with certain implementations.

FIG. 3 illustrates logic for processing configuration data in accordance with certain implementations. Control begins at block 300 with the universal adapter 200 receiving one or more configuration files 212. The universal adapter 200 uses a configuration file 212 to store properties for the protocol listeners 222, 224, 226, protocol handlers 242, 244, 246, data transformers 252, 254, 256, and properties specific to the universal adapter runtime (e.g., a location of a log file, communication means for communicating with the integration engine 140, etc.). Each protocol listener 222, 224, 226 and protocol handler 242, 244, 246 may have a separate set of properties. In block 302, the universal adapter 200 stores the one or more configuration files 212 persistently. In block 304, the universal adapter 200 instantiates the protocol listeners, protocol handlers, and/or data transformers defined in the one or more configuration files 212. In particular, the framework implementation 210 reads the one or more configuration files 212 and determines which protocol listeners 222, 224, 226 and which protocol handlers 242, 244, 246 are supported. The framework implementation 210 also determines from the configuration files 212 how many listener worker threads are to be instantiated for the listener worker thread pool 230.

FIG. 4 illustrates properties 400 for protocol listeners 402, 404, 406 in accordance with certain implementations. For example, the properties specify that 10 listener worker threads 410 are required, along with a requestpoolsize of 10. Three protocol listeners 402, 404, 406 are defined: SOAPHTTPListener1, SOAPHTTPSListener1, and SOAPJMSListener1. In the illustration, the properties of the SOAPJMSListener1 protocol listener 406 are listed and indicate that the data format type for this protocol listener 222, 224, 226 is xml/soap 430, which is used as a hint to instantiate a SOAP data transformer. The xml/soap 430 value is a default value for the SOAPDHMimeType connector configuration property 432 and is used when no data transformation rules 262 are specified for determining the data transformer 252, 254, 256 to be used. Thus, in addition to transport specific properties, a system administrator may define properties that aid in determining the data transformer 252, 254, 256 to be used for transformation of data. Similarly, although not shown in FIG. 4, an HTTP protocol listener 402 may have properties such as host/port to listen on, context path used, proxy host, proxy port, and Secure Sockets Layer (SSL).

FIG. 5 illustrates properties 500 for protocol handlers 502, 504 in accordance with certain implementations. Two protocol handlers 502, 504 are defined: SOAPHTTPHTTPSHandler and SOAPJMSHandler. The protocol specified for the SOAPHTTPHTTPSHandler protocol handler 502 is soap/http 510, which indicates that data is to be transformed into SOAP data format and transmitted via HTTP.

FIG. 6 illustrates properties 600 for data transformers 602, 604 in accordance with certain implementations. Two data transformers 602, 604 are defined: text_xml and xml_soap.

FIG. 7 illustrates data transformer rules for a protocol listener 700 in accordance with certain implementations. For example, the TransformationRules 702 specify data transformation rules that may be used to determine a data transformer 252, 254, 256 to be used to convert data.

In various implementations, the data transformer rules may be based on configuration properties, data from an application ("application data"), data from an integration engine, protocol specific information, startup information, runtime information, and/or other factors.

Figure 8A:
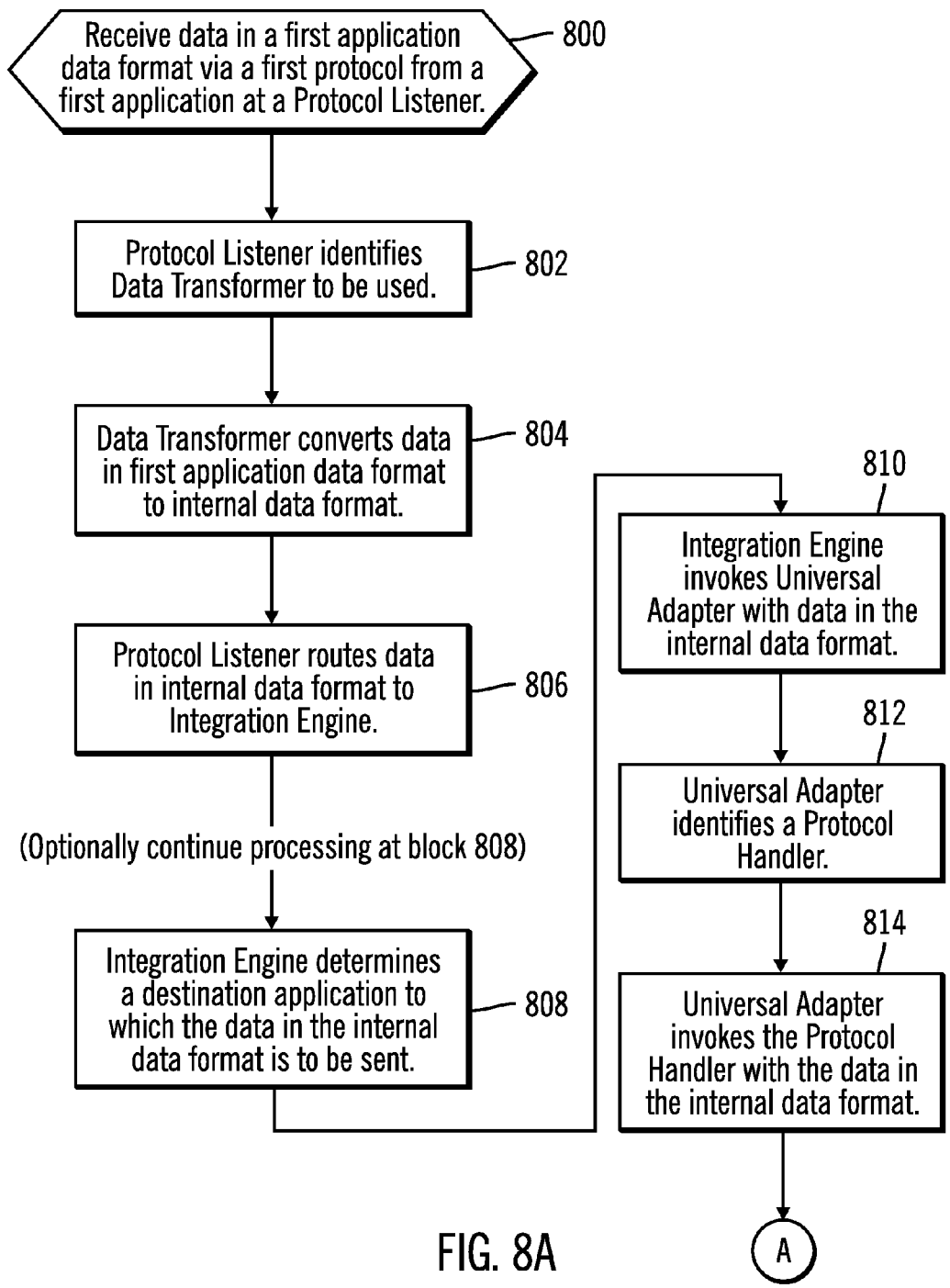
FIGS. 8A, 8B, and 8C illustrate logic to route data in accordance with certain implementations.
Figure 8B:
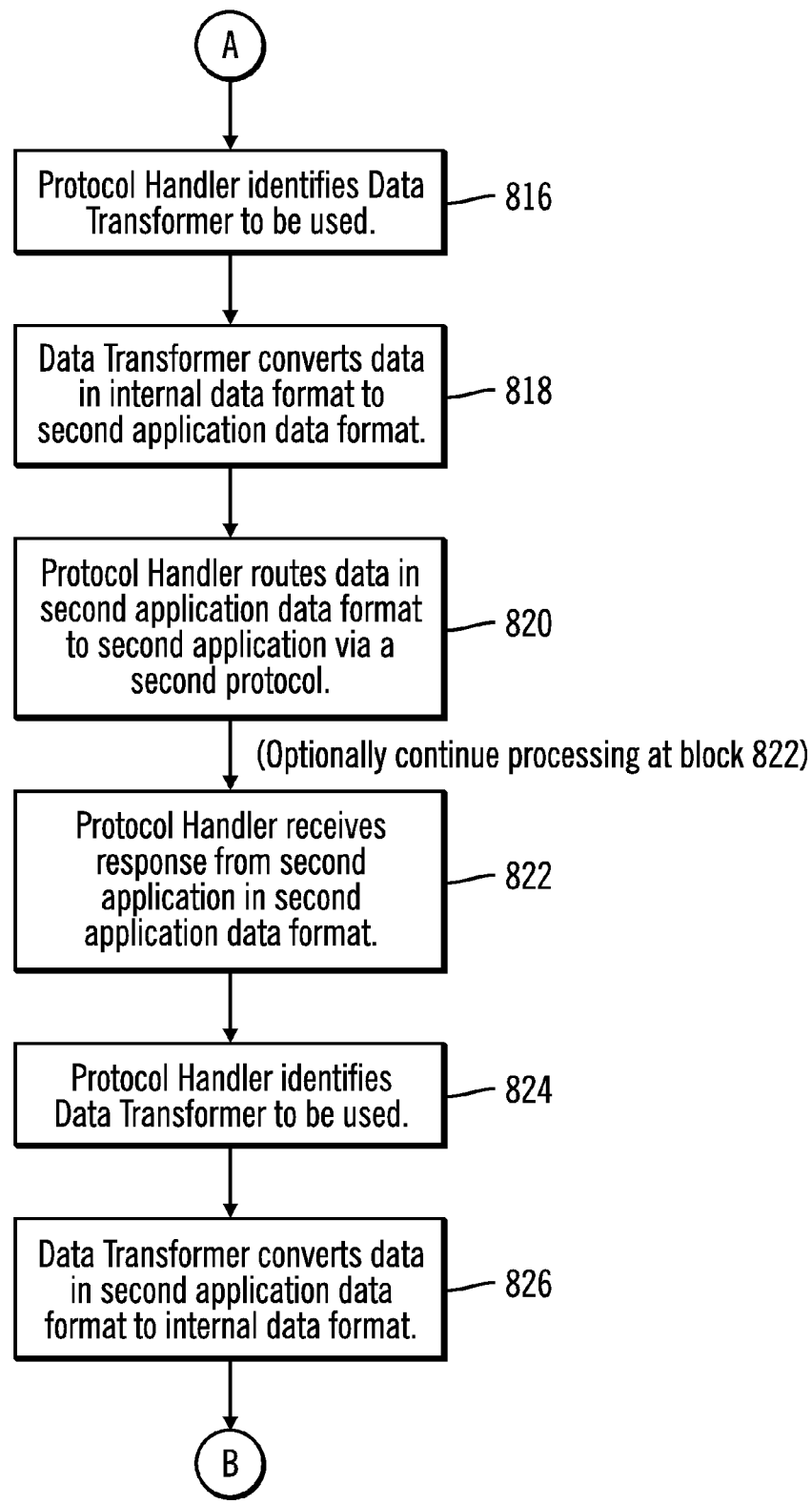
Figure 8C:
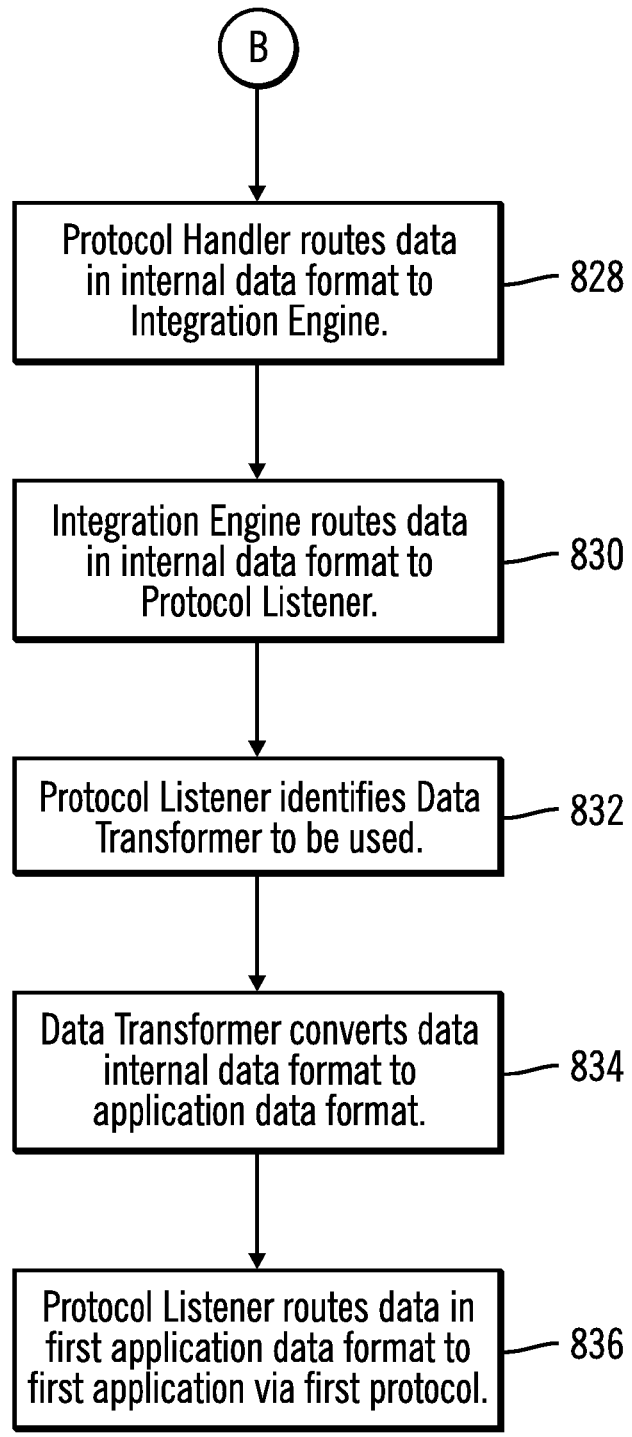

FIGS. 8A, 8B, and 8C illustrate logic to route data in accordance with certain implementations. Control begins at block 800 with a protocol listener 222, 224, 226 at the universal adapter 200 receiving data (e.g., a "request message") in a first application data format via a first protocol from a first application 106, 116. In certain implementations, the first application 106, 116 sends the data to a protocol listener (e.g., 222) which is part of the universal adapter 200.

In block 802, the protocol listener 222 identifies a data transformer 252, 254, 256 to be used to transform the data in the first application data format to an internal data format. When the protocol listener 222, 224, 226 receives a request, the protocol listener 222, 224, 226 determines a DataTransformer ID (or MimeType) using data transformation rules 262 and the rules engine 260. For example, HTTP based protocol listener 222 may use a type/subtype (in this example, "ContentType" and type/subtype of Content-Type header are used interchangeably) portion of a Content-Type header to determine the data transformer 252, 254, 256. In certain implementations, the protocol listener 222, 224, 226 determines the DataTransformer ID for a request message according to the following rules in the sequence listed:

Rule 1. If there are data transformation rules 262 for a Uniform Resource Locator (URL) used by the incoming request message and if the request ContentType matches the ContentType of a data transformation rule 262, then the protocol listener 222, 224, 226 uses the data transformation rule 262 to extract the DataTransformer ID for conversion of the request message into an internal data format. The protocol listener 222, 224, 226 attempts to find an exact data transformation rule 262 match based on the ContentType value (e.g., audio/mp3) in the URLsConfiguration property for the requested URL.

Rule 2. If rule 1 fails, the protocol listener 222, 224, 226 attempts to find a data transformation rule 262 that applies to more than one type/subtype under the URL used by the incoming request message (e.g., text/*, */*).

Rule 3. If there is no data transformation rule 262 match for the ContentType, then the protocol listener 222, 224, 226 uses the SOAPDHMimeType connector configuration property (e.g., 432) as the DataTransformer ID value.

Rule 4. If all previous rules fail to determine the DataTransformer ID, the value of ContentType is used as the DataTransformer ID.

Thus, implementations provide a flexible mechanism of specifying data transformation information. For example, the universal adapter 200 provides a flexible and configurable mechanism to specify data transformation rules 262 that may be used to determine the data transformer 252, 254, 256 based on any message level, transport level or static user specified information. For example, a Content-Type header of an HTTP message may be used to carry the data transformation information. In this case, the Content-Type header is specified as the data transformation property in the protocol listener 222, 224, 226 or protocol handler 242, 244, 246 configuration data. Also, data transformation information may be specified as a property of a protocol listener 222, 224, 226 (e.g., FIG. 4, 430) or a property of a protocol handler 242, 244, 246 (e.g., FIG. 5, 510). When the protocol listener 222, 224, 226 receives a request from an application or when a protocol handler 242, 244, 246 receives a response from the application, the protocol listener 222, 224, 226 or protocol handler 242, 244, 246 use the data transformation property to identify the data transformer 252, 254, 256. Similarly, when the protocol listener 222, 224, 226 sends a response to the application or when a protocol handler 242, 244, 246 sends a request to an application, the protocol listener 222, 224, 226 or protocol handler 242, 244, 246 uses the data transformation property to determine the data transformer to invoke.

In addition, the universal adapter 200 provides the ability to specify different data transformers 252, 254, 256 for different pieces of the business data. This enables an application to send and receive data in multiple formats in a single message.

Returning to FIG. 8A, in block 804, the identified data transformer 252, 254, 256 converts the data in the first application data format to an internal data format. In certain implementations, the data in the first application data format comprises multiple data formats, and each data format is processed by a different data transformer 252, 254, 256. For example, the identified data transformer 252, 254, 256 may invoke another data transformer 252, 254, 256 for processing parts of the data. In block 806, the protocol listener 222, 224, 226 routes the converted data in the internal data format to the integration engine 140. From block 806, processing may optionally continue to block 808 or processing may terminate after the processing of block 806. In block 808, the integration engine 808 receives the data from the protocol listener 222, 224, 226 and determines the destination (second) application (if necessary) to which the data in the internal data format needs to be sent. In block 810, the integration engine invokes the universal adapter 200 with the data in the internal data format. In block 812, the universal adapter 200 determines the protocol handler 242, 244, 246 that is to send data to the second application. In block 814, the universal adapter 200 invokes the protocol handler 242, 244, 246 with the data in the internal data format.

From block 814, processing continues to block 816 (FIG. 8B). In block 816, the protocol handler 242, 244, 246 identifies a data transformer 252, 254, 256 to be used to S convert the data in the internal data format that was included in the data in the internal data format. In block 818, the data transformer 252, 254, 256 converts data in the internal data format to a second application data format. In block 820, the protocol handler 242, 244, 246 routes the data in the second application format to a second application via a second protocol. The first protocol and second protocol may be the same or different protocols. The first application data format and the second application data format may be the same or different data formats.

From block 820, processing may optionally continue to block 822 or processing may terminate after the processing of block 820. In block 822, the protocol handler 242, 244, 246 receives a response from the second application in the second application data format. In block 824, the protocol handler 242, 244, 246 identifies a data transformer 252, 254, 256 to be used. In block 826, the data transformer 252, 254, 256 converts data in the second application data format to the internal data format. Processing continues from block 826 to block 828 (FIG. 8C). In block 828, the protocol handler 242, 244, 246 routes the converted data in the internal data format to the integration engine 140.

In block 830, the integration engine 140 routes the data in the internal data format to the protocol listener 222, 224, 226. In block 832, the protocol listener 222, 224, 226 identifies a data transformer 252, 254, 256. In block 834, the identified data transformer 252, 254, 256 converts the data from the internal data format to the first application data format. In block 836, the protocol listener 222, 224, 226 routes the data in the first application format to the first application 106, 116 via the first protocol.

Implementations allow the transport protocol information (which specifies a transport protocol) and data transformation information (which specifies or provides hints on which data transformer is to be used) for integration to be specified in an internal data format. An internal data format may be described as an internal representation of data. The universal adapter 200 uses the transport protocol information specified in the internal data format to determine the protocol handler 242, 244, 246. Protocol listeners 222, 224, 226 listen/poll on pre-defined destinations for incoming events. The internal data format can also contain data transformation information that may be used to select a data transformer 252, 254, 256.

The universal adapter 200 propagates the transport protocol information in both directions: application to internal data formats and internal data formats to application. Exposing the transport protocol information to the internal business processes provides greater flexibility and control to the business processes in dictating the protocol level information. For example, a HTTP based protocol handler/protocol listener is able to propagate standard HTTP headers, such as Content-Length and Accept, to/from the internal data format.

Figure 9:
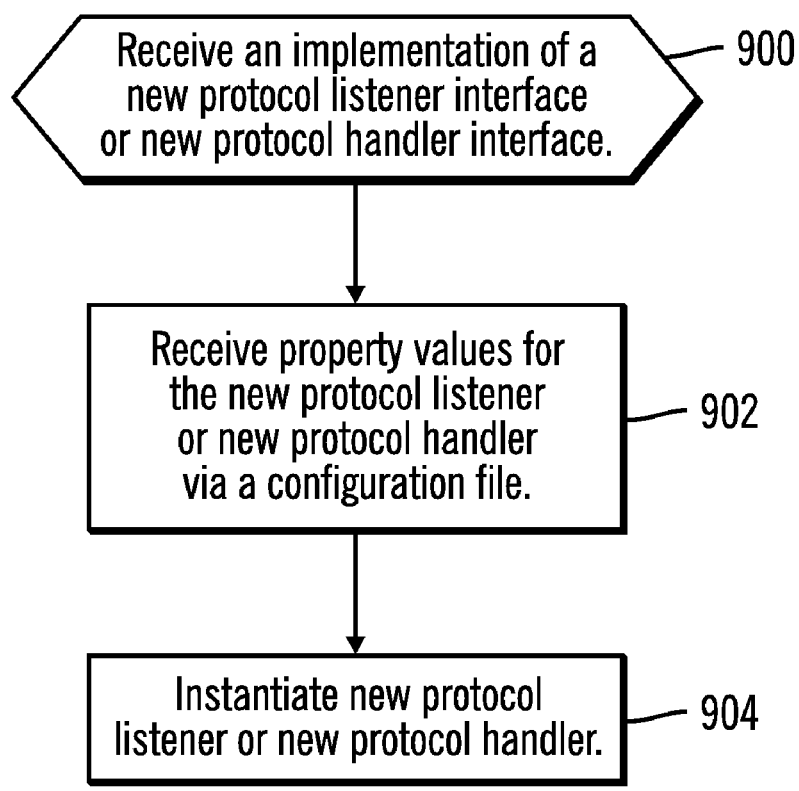
FIG. 9 illustrates logic for adding new protocol listeners and protocol handlers in accordance with certain implementations.

FIG. 9 illustrates logic for adding new protocol listeners and protocol handlers in accordance with certain implementations. Control begins at block 900 with receipt of an implementation for a new protocol listener interface or new protocol handler interface at the universal adapter 200. The implementation may be generated by, for example, a developer. In block 902, property values for the new protocol listener or new protocol handler are received via a configuration file. The property values are defined by, for example, a system administrator. Then, in block 904, the universal adaptor 200 enables "use of" the protocol listener or protocol handler (e.g., instantiates the newly added protocol listener or protocol handler). With this, the newly added protocol listener or protocol handler is up and running on the universal adapter 200. In this manner, custom protocol listeners and protocol handlers are supported and new protocols may be implemented.

FIGS. 10A, 10B and 10C illustrate sample interfaces 1000, 1010 and 1020 for implementing a custom protocol listener in accordance with certain implementations. In the sample interfaces 1000, 1010, slashes and asterisks precede comments.

FIGS. 11A and 11B illustrate sample interfaces 1100 and 1110 for implementing a custom protocol handler in accordance with certain implementations. In the sample interfaces 1100, 1110, slashes and asterisks precede comments.

Figure 12:
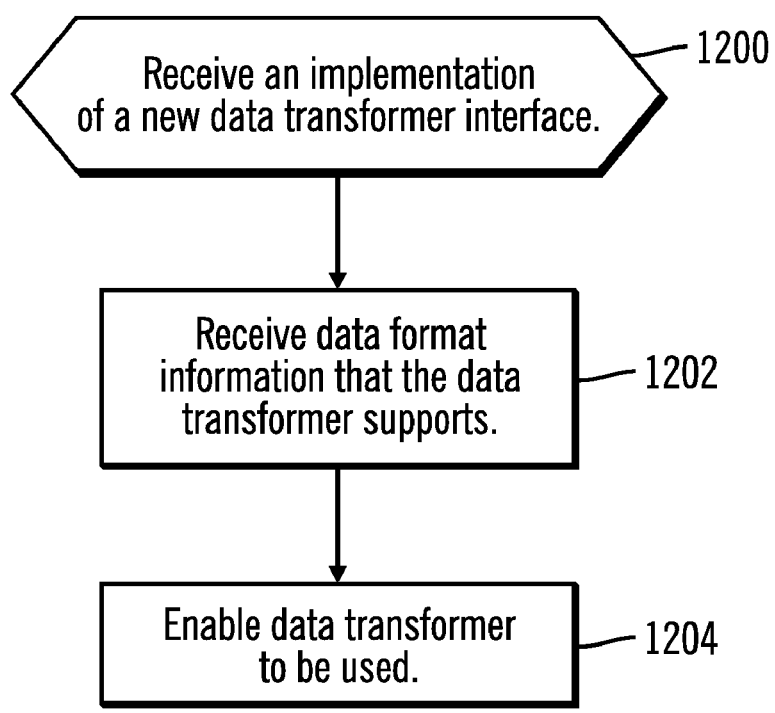
FIG. 12 illustrates logic for adding new data transformers in accordance with certain implementations.

FIG. 12 illustrates logic for adding new data transformers in accordance with certain implementations. Control begins at block 1200 with receipt of an implementation of a data transformer interface. The new data transformer implementation may be done by, for example, a technical consultant. In block 1202, data format information that the data transformer supports is received. The data format information is specified by, for example, a technical consultant, in a configuration file. In block 1204, the universal adapter 200 automatically enables use of the data transformer for appropriate data transformations.

FIGS. 13A and 13B illustrate sample interfaces 1300, 1310 for implementing a data transformer in accordance with certain implementations. In the sample interfaces 1300, 1310, slashes and asterisks precede comments.

Thus, implementations provide an easy to use and flexible universal adapter 200 architecture to configure the transport protocol and data format used for integration with many features. For example, implementations decouple the transport protocol processor from the data transformation engine, thereby providing the ability to vary both the transport protocol and the data transformation information at runtime. The implementations provide an easily configurable technique to process data present in multiple formats. The implementations provide a configurable and declarative technique to specify the properties/technique used to carry data transformation information. The described architecture makes it easy to configure and adapt to changing and evolving customer requirements, in the process, reducing customer costs for maintenance and incremental changes. The implementations provide the ability to transfer protocol information to and from the internal business processes in a configurable manner. The implementations run as a single process, thereby reducing hardware and software resources. The single process architecture also reduces the administration and maintenance requirements. The implementations reduce the development time and costs to support evolving transport protocols and data formats required for application integration. Implementations provide a flexible and configurable application integration mechanism. Data in multiple data formats from an application can be received/sent over multiple transport protocols to/from an integration server.

Furthermore, implementations provide separation of protocol specific information and application data; pluggable implementations of protocol listeners, protocol handlers, and data transformers; different ways of specifying data transformation information; the ability to process application data in multiple data formats using multiple data transformers; and the ability to propagate protocol specific data between an application an the integration engine. Moreover, the universal adapter executes as a single process, which reduces maintenance and administrative costs for managing the universal adapter.

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3, 8A, 8B, 8C, 9, and 12 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3, 8A, 8B, 8C, 9, and 12 may be implemented in software, hardware, programmable and non-programmable gate array logic or in some combination of hardware, software, or gate array logic.

Figure 14:
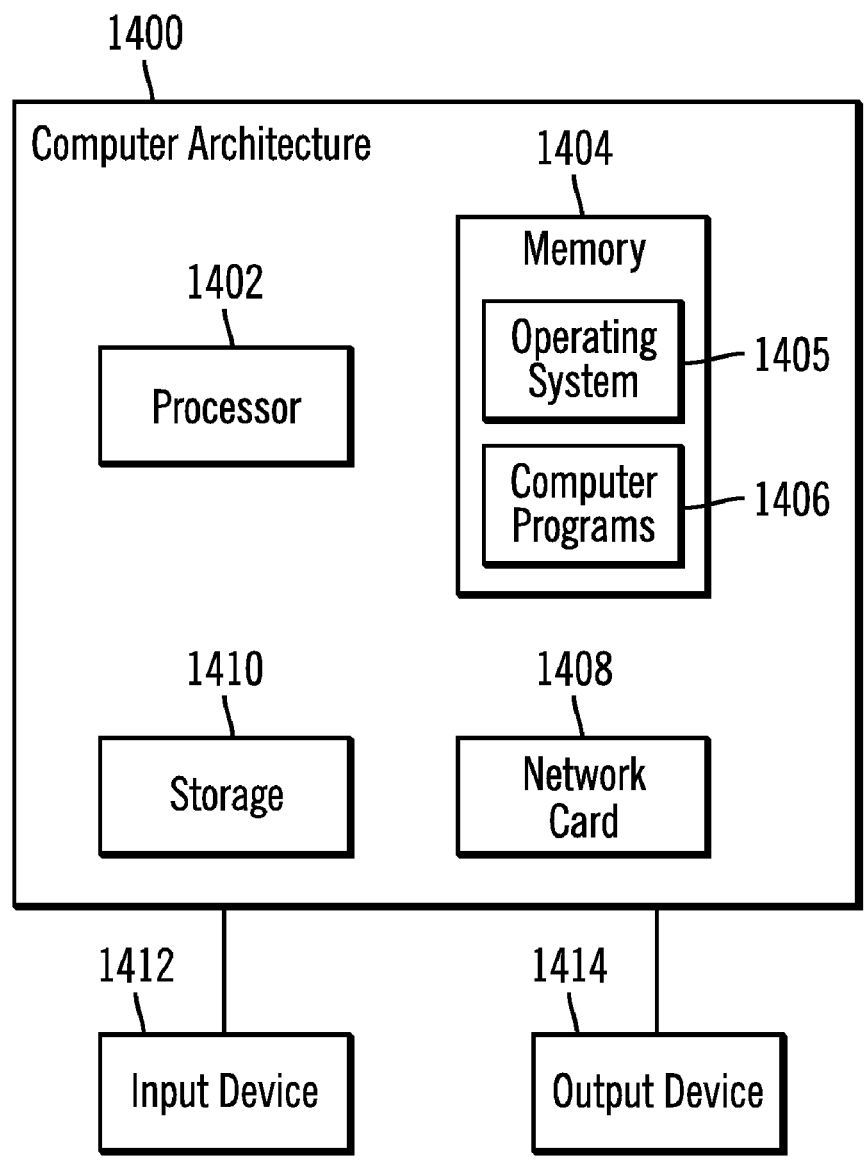
FIG. 14 illustrates an architecture of a computer system that may be used in accordance with certain implementations.

FIG. 14 illustrates an architecture 1400 of a computer system that may be used in accordance with certain implementations. Computing devices 100, 110 and integration server 120 may implement architecture 1400. The computer architecture 1400 may implement a processor 1402 (e.g., a microprocessor), a memory 1404 (e.g., a volatile memory device), and storage 1410 (e.g., a non-volatile storage area, such as magnetic disk drives, optical disk drives, a tape drive, etc.). An operating system 1405 may execute in memory 1404. The storage 1410 may comprise an internal storage device or an attached or network accessible storage. Computer programs 1406 in storage 1410 may be loaded into the memory 1404 and executed by the processor 1402 in a manner known in the art. The architecture further includes a network card 1408 to enable communication with a network. An input device 1412 is used to provide user input to the processor 1402, and may include a keyboard, mouse, pen-stylus, microphone, touch sensitive display screen, or any other activation or input mechanism known in the art. An output device 1414 is capable of rendering information from the processor 1402, or other component, such as a display monitor, printer, storage, etc. The computer architecture 1400 of the computer systems may include fewer components than illustrated, additional components not illustrated herein, or some combination of the components illustrated and additional components.

The computer architecture 1400 may comprise any computing device known in the art, such as a mainframe, server, personal computer, workstation, laptop, handheld computer, telephony device, network appliance, virtualization device, storage controller, etc. Any processor 1402 and operating system 1405 known in the art may be used.

The foregoing description of implementations has been presented for the purposes of illustration and description. It is not intended to be exhaustive or to limit the implementations to the precise form disclosed. Many modifications and variations are possible in light of the above teaching. It is intended that the scope of the implementations be limited not by this detailed description, but rather by the claims appended hereto. The above specification, examples and data provide a complete description of the manufacture and use of the composition of the implementations. Since many implementations can be made without departing from the spirit and scope of the invention, the implementations reside in the claims hereinafter appended or any subsequently-filed claims, and their equivalents.

Java is a registered trademark or common law mark of Sun Microsystems in the United States and/or other countries.

What is claimed is:

1. A method for application integration, comprising:
   receiving data at a universal adapter at a computer system with a processor, wherein the universal adapter executes as a single process, wherein the universal adapter includes protocol listeners that each process data that is received in a particular protocol, protocol handlers that each process data to be sent in a particular protocol, data transformers to perform data transformation between internal data formats and application data formats, data transformation rules for use in selecting the data transformers, and configuration files to store configuration properties for the protocol listeners, the protocol handlers, and the data transformers;
   identifying one or more data transformers to be used to convert the data using the data transformation rules and configuration properties;
   converting the data using the identified one or more data transformers; and
   routing the data to one of an application or an integration engine.

2. The method of claim 1, wherein the application comprises a first application and wherein the received data is received from the integration engine and is routed to the first application.

3. The method of claim 1, wherein the application comprises a first application and wherein the received data is received from a second application and is routed to the integration engine.

4. The method of claim 1, wherein the one or more data transformation rules are based on at least one of the configuration properties, data from the application, data from the integration engine, protocol specific information, startup information, and runtime information.

5. The method of claim 1, wherein protocol specific information is propagated during the conversion of the data.

6. The method of claim 1, wherein the received data and the routed data are in different data formats.

7. The method of claim 1, wherein the received data and the routed data are transferred over different protocols.

8. The method of claim 1, wherein the received data comprises data in multiple data formats, and wherein each of the multiple data formats is processed by a different data transformer.

9. The method of claim 1, further comprising:
   receiving one or more configuration files;
   storing the one or more configuration files persistently; and
   instantiating the protocol listeners and the protocol handlers defined in the one or more configuration files.

10. The method of claim 1, further comprising:
    receiving an implementation of an interface for a new protocol listener;
    receiving property values for the new protocol listener; and
    instantiating the new protocol listener.

11. The method of claim 1, further comprising:
    receiving an implementation of an interface for a new protocol handler;
    receiving property values for the new protocol handler; and
    instantiating the new protocol handler.

12. The method of claim 1, further comprising:
    receiving an implementation of an interface for a new data transformer;
    receiving data format information that the data transformer supports; and
    enabling the data transformer to be used.

13. A computer readable medium including a program for application integration, wherein the program when executed by a processor is capable of causing operations to be performed, the operations comprising:
    receiving data at a universal adapter, wherein the universal adapter executes as a single process, wherein the universal adapter includes protocol listeners that each process data that is received in a particular protocol, protocol handlers that each process data to be sent in a particular protocol, data transformers to perform data transformation between internal data formats and application data formats, data transformation rules for use in selecting the data transformers, and configuration files to store configuration properties for the protocol listeners, the protocol handlers, and the data transformers;
    identifying one or more data transformers to be used to convert the data using the data transformation rules and configuration properties;
    converting the data using the identified one or more data transformers; and
    routing the data to one of an application or an integration engine.

14. The computer readable medium of claim 13, wherein the application comprises a first application and wherein the received data is received from the integration engine and is routed to the first application.

15. The computer readable medium of claim 13, wherein the application comprises a first application and wherein the received data is received from a second application and is routed to the integration engine.

16. The computer readable medium of claim 13, wherein the one or more data transformation rules are based on at least one of the configuration properties, data from the application, data from the integration engine, protocol specific information, startup information, and runtime information.

17. The computer readable medium of claim 13, wherein protocol specific information is propagated during the conversion of the data.

18. The computer readable medium of claim 13, wherein the received data and the routed data are in different data formats.

19. The computer readable medium of claim 13, wherein the received data and the routed data are transferred over different protocols.

20. The computer readable medium of claim 13, wherein the received data comprises data in multiple data formats, and wherein each of the multiple data formats is processed by a different data transformer.

21. The computer readable medium of claim 13, wherein the operations further comprise:
    receiving one or more configuration files;
    storing the one or more configuration files persistently; and
    instantiating the protocol listeners and protocol handlers defined in the one or more configuration files.

22. The computer readable medium of claim 13, wherein the operations further comprise:
    receiving an implementation of an interface for a new protocol listener;
    receiving property values for the new protocol listener; and
    instantiating the new protocol listener.

23. The computer readable medium of claim 13, wherein the operations further comprise:
    receiving an implementation of an interface for a new protocol handler;

receiving property values for the new protocol handler; and instantiating the new protocol handler.

24. The computer readable medium of claim 13, wherein the operations further comprise:
receiving an implementation of an interface for a new data transformer;
receiving data format information that the data transformer supports; and
enabling the data transformer to be used.

25. A system for application integration, comprising:
hardware logic capable of causing operations to be performed, the operations comprising:
receiving data at a universal adapter, wherein the universal adapter executes as a single process, wherein the universal adapter includes protocol listeners that each process data that is received in a particular protocol, protocol handlers that each process data to be sent in a particular protocol, data transformers to perform data transformation between internal data formats and application data formats, data transformation rules for use in selecting the data transformers, and configuration files to store configuration properties for the protocol listeners, the protocol handlers, and the data transformers;
identifying one or more data transformers to be used to convert the data using the data transformation rules and configuration properties;
converting the data using the identified one or more data transformers; and
routing the data to one of an application or an integration engine.

26. The system of claim 25, wherein the application comprises a first application and wherein the received data is received from the integration engine and is routed to the first application.

27. The system of claim 25, wherein the application comprises a first application and wherein the received data is received from a second application and is routed to the integration engine.

28. The system of claim 25, wherein the one or more data transformation rules are based on at least one of the configuration properties, data from the application, data from the integration engine, protocol specific information, startup information, and runtime information.

29. The system of claim 25, wherein protocol specific information is propagated during the conversion of the data.

30. The system of claim 25, wherein the received data and the routed data are in different data formats.

31. The system of claim 25, wherein the received data and the routed data are transferred over different protocols.

32. The system of claim 25, wherein the received data comprises data in multiple data formats, and wherein each of the multiple data formats is processed by a different data transformer.

* * * * *